United States Patent
Rimhagen et al.

(10) Patent No.: US 10,469,602 B2
(45) Date of Patent: *Nov. 5, 2019

(54) ORDERING TRACING OF WIRELESS TERMINAL ACTIVITIES

(71) Applicant: Telefonaktiebolaget LM Ericsson (Publ), Stockholm (SE)

(72) Inventors: Anna Pucar Rimhagen, Motala (SE); Robert Petersen, Linköping (SE); Per-Daniel Stålnacke, Bromma (SE); Edwin Tse, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 698 days.

This patent is subject to a terminal disclaimer.

(21) Appl. No.: 14/623,182

(22) Filed: Feb. 16, 2015

(65) Prior Publication Data

US 2015/0163688 A1 Jun. 11, 2015

Related U.S. Application Data

(63) Continuation of application No. 12/528,925, filed as application No. PCT/SE2007/000903 on Oct. 15, 2007, now Pat. No. 8,972,562.

(30) Foreign Application Priority Data

Feb. 27, 2007 (WO) ................. PCT/SE2007/000181

(51) Int. Cl.
*H04L 12/26* (2006.01)
*H04L 29/08* (2006.01)
*H04W 24/10* (2009.01)

(52) U.S. Cl.
CPC ............. *H04L 67/22* (2013.01); *H04W 24/10* (2013.01)

(58) Field of Classification Search
USPC .................. 370/236, 241, 252, 328; 709/224
See application file for complete search history.

(56) References Cited

U.S. PATENT DOCUMENTS 5,664,006 A * 9/1997 Monte ................ H04B 7/18539
370/320
6,347,217 B1 2/2002 Bengtsson et al.
(Continued)

FOREIGN PATENT DOCUMENTS

GB 2401283 A 11/2004
JP 2004289774 A 10/2004
(Continued)

*Primary Examiner* — Kwang B Yao
*Assistant Examiner* — Nguyen H Ngo
(74) *Attorney, Agent, or Firm* — Coats & Bennett, PLLC (57) ABSTRACT

According to the invention a core network management device (32) in a core network section (CN) of the wireless network (WN) receives a request for a tracing regarding a wireless terminal (16). The request includes an address of a destination device (26) that is to receive trace log data or data enabling the locating of the address. The core network management device (32) then automatically orders, based on the request, network elements (10, 12, 14, 20, 22, 24) of an access network section (AN) of the wireless network (WN) to perform tracing regarding the wireless terminal (16) and ensures that the trace log data is sent to the destination trace log data handling device (26). The request with the address may be sent from an access network management device (26) in the access network section (AN).

19 Claims, 3 Drawing Sheets

(56) References Cited

U.S. PATENT DOCUMENTS

| | | |
|---|---|---|
| 6,445,917 B1 | 9/2002 | Bark et al. |
| 6,636,742 B1 | 10/2003 | Torkki et al. |
| 6,832,085 B1 | 12/2004 | McDonagh et al. |
| 6,924,727 B2 | 8/2005 | Nagaoka et al. |
| 7,139,820 B1 | 11/2006 | O'Toole, Jr. et al. |
| 7,260,406 B2 | 8/2007 | Lee et al. |
| 7,369,492 B2 | 5/2008 | Shimizu |
| 7,512,381 B1 | 3/2009 | Sylvain |
| 7,564,952 B2 | 7/2009 | Kikuchi |
| 7,577,439 B2 | 8/2009 | Halonen |
| 7,747,740 B2 | 6/2010 | Doshi et al. |
| RE41,750 E | 9/2010 | Christy |
| 7,823,199 B1 | 10/2010 | Rathi et al. |
| 7,916,701 B1 * | 3/2011 | Viswanath .......... H04L 12/5691 370/338 |
| 7,929,512 B2 | 4/2011 | Malomsoky et al. |
| 8,190,136 B2 * | 5/2012 | Pucar Rimhagen ......................... H04L 41/0233 455/414.3 |
| 8,972,562 B2 * | 3/2015 | Rimhagen ............. H04W 60/00 709/224 |
| 2002/0059449 A1 * | 5/2002 | Wandel ............... H04L 12/5855 709/238 |
| 2002/0120765 A1 | 8/2002 | Boehmke |
| 2002/0127993 A1 | 9/2002 | Zappala |
| 2003/0148755 A1 | 8/2003 | Bovo et al. |
| 2004/0125781 A1 * | 7/2004 | Walter .................... H04L 12/14 370/338 |
| 2005/0128946 A1 | 6/2005 | Murakami et al. |
| 2006/0084423 A1 | 4/2006 | Bjorken |
| 2006/0217115 A1 | 9/2006 | Cassett et al. |
| 2006/0218271 A1 | 9/2006 | Kasslin et al. |
| 2006/0224730 A1 | 10/2006 | Fok et al. |
| 2006/0244588 A1 * | 11/2006 | Hannah ................... A47F 10/04 340/539.13 |
| 2006/0288102 A1 | 12/2006 | Spicer et al. |
| 2006/0293029 A1 * | 12/2006 | Jha .................... H04M 1/72522 455/411 |
| 2007/0109990 A1 * | 5/2007 | Bennett ............... H04L 12/2898 370/328 |
| 2007/0133454 A1 * | 6/2007 | Ware ................. H04W 72/1231 370/328 |
| 2007/0204015 A1 | 8/2007 | Gonzalez Lopez et al. |
| 2007/0206741 A1 * | 9/2007 | Tiliks .................. H04M 3/2281 379/106.02 |
| 2008/0060071 A1 * | 3/2008 | Hennan ............... H04L 63/1416 726/22 |
| 2008/0250132 A1 | 10/2008 | Ji et al. |
| 2009/0117906 A1 * | 5/2009 | Thomas ............. H04W 36/0066 455/439 |
| 2009/0168719 A1 * | 7/2009 | Mercurio ............. H04M 15/44 370/331 |
| 2009/0310576 A1 | 12/2009 | Sekiya |

FOREIGN PATENT DOCUMENTS

| | | |
|---|---|---|
| JP | 2006180242 A | 7/2006 |
| JP | 2006350458 A | 12/2006 |
| WO | 0147182 A2 | 6/2001 |
| WO | 2007107891 A2 | 9/2007 |

* cited by examiner

ORDERING TRACING OF WIRELESS TERMINAL ACTIVITIES

CROSS-REFERENCE TO RELATED APPLICATIONS

This is a continuation of U.S. patent application Ser. No. 12/528,925, which was the National Stage of International Application No. PCT/SE2007/000903 filed 15 Oct. 2007, which in turn claims priority to International Application No. PCT/SE2007/000181 filed 27 Feb. 2007, which are hereby incorporated by reference in their entirety.

TECHNICAL FIELD

The present invention relates to the field of tracing the activities of wireless terminals in wireless networks. The invention more particularly relates to a method and a core network management device for ordering a tracing of the activities of a wireless terminal in a wireless network as well as to a method and an access network management device for initiating a tracing of the activities of a wireless terminal in a wireless network.

BACKGROUND

In a typical cellular radio system, wireless terminals in the form of mobile user equipment units (UEs) communicate via a radio access network (RAN) section to one or more core network sections of a wireless network. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with a radio access network.

The radio access network (RAN) section covers a geographical area which is divided into cell areas, with each cell area being served by a wireless access point handling device. A cell is a geographical area where radio coverage is provided by the wireless access point handling device, which wireless access point handling device in some networks, like GSM, UMTS and LTE, is provided as radio base station equipment at a base station site. This wireless access point handling device is a network element that provides a wireless access point in the form of an air interface (e.g., radio frequencies) for communication with the wireless terminals within range of the access point. In the radio access network the end connectivity to the wireless terminal is performed. In UMTS (Universal Mobile Telecommunications) and GSM (Global System for Mobile communications) a base station is connected to another network element in the form of a radio network controller (RNC) or a base station controller (BSC) in the radio access network section, while in other types of networks, like LTE (Long Term Evolution), the functionality of the radio network controller is provided in the access point itself. In LTE networks the access point handling device is named eNodeB (Evolved NodeB). The network elements in the radio access network do in turn communicate with connection setup devices in a core network section of the wireless network, which in the case of UMTS and GSM is an MSC (Mobile Services Switching Centre), which sets up connections between user equipment units and other terminals or other user equipment units or other networks. In LTE the corresponding network elements are typically based on elements such as routers.

The different network elements in the core network section and access network section are furthermore managed by various network management devices. This may be done in order to monitor the functionality of the elements in the network in order to for instance detect faults and provide servicing of the network elements. The network management devices are often separated for the access network section and the core network section, but can also be combined.

In the core network section there are furthermore often low level core network management devices, which are often called SNM (Sub Network Manager), NEM (Network Element Manager) or EMS (Element Management System). Normally one low level core network management device will handle network elements provided by one, single supplier. This means that an operator of a wireless network that has several network element suppliers, i.e. an operator operating in a multi-supplier environment will have several, separate low level core network management devices. On top of the low level core network management device, in the core network section, there is normally provided a high level core network management device. This device is often termed NMC (Network Management Center). The high level core management device is multi-supplier and provided on a network level, and has a higher abstraction level than the low level core network management devices. It coordinates data from several low level core network management devices.

In the access network section there is also one or more access network management devices that are similar to the low level core network management devices. The only difference between the access network management devices and the low level core network management devices, apart from the obvious differences resulting because of the different nature of the network elements they are serving, is in many aspects only the network section they are provided in. Therefore the same terminology is normally used for the access network management devices and the low level core network management devices.

It is in many cases of interest to trace the activities of wireless terminals. This may be of interest in order to see if the network is functioning properly for a wireless terminal. When the activities of a wireless terminal are traced, the wireless terminal is followed through the network and all relevant messages and data are logged along the way. This data gives valuable input regarding how well the network operates, and also information for trouble shooting.

Typical data that could be logged is information about the speech quality and events that have occurred along the way (like a dropped call or a handover).

Today such tracing is started in the core network, i.e. so-called signalling based activation, and then typically by a core network management device. Such a tracing can then be ordered by an operator of a low level core network management device or a high level core management device. In the ordering of such a tracing a wireless terminal or a subscriber identity associated with the wireless terminal is specified, together with other types of data, like for example:

which parts of the network where the tracing shall be carried out (e.g. in the whole network, or in a region) and trace depth (i.e. which data and messages shall be logged).

How such tracing may be performed in a network is for instance described in 3GPP TS 32.421 V7.2.0 (2006-09), 3GPP TS 32.422 V7.2.0 (2006-12) and 3GPP TS 32.423 V7.4.0 (2006-12).

However, the analysis of log data that is the result of such a tracing need often be done in access network management devices and not in core network management devices. It is therefore of interest to provide the results from such tracing to other entities than a core network management device. This is today not possible to do in a simple way.

Today, when performing such tracing, the logged data will be sent to a low level core network management device of a network element that is performing the tracing. If the traced wireless terminal moves between network elements belonging to different low level core network management devices during the tracing, the data from the same tracing will be sent to different low level core network management devices.

According to this known way of performing tracing, the user who wants to process the log data has to him/herself make sure that the logged data from different low level core network management devices is exported/imported so that it can all be post processed together in the same device. This is thus not done in any automatic way and normally involves contacts with other users of the network in order to be able to obtain the necessary data. This is both time consuming and cumbersome, and can also easily go wrong.

There is therefore a need for an improvement in the delivery of trace results.

SUMMARY

The present invention is therefore directed towards providing a simpler and more user-friendly delivery of the results of a tracing performed regarding the activities of a wireless terminal in a wireless network.

This is generally solved through ordering, from a core network management device, network elements in an access network section to perform a tracing of the activities of a wireless terminal and including an address of a destination trace log data handling device that is to receive trace log data in the order. The destination trace log data handling device may receive the trace log data automatically in response to the order being sent or alternatively receives information on nodes that keep trace log data available for the destination trace log data handling device.

One object of the present invention is thus to provide a method for ordering a tracing of the activities of a wireless terminal in a wireless network, which method allows a simpler and more user-friendly collection of the results of the tracing.

This object is according to a first aspect of the present invention achieved through a method for ordering a tracing of the activities of a wireless terminal in a wireless network. In the method a core network management device provided in a core network section of the wireless network receives a request for a tracing regarding a wireless terminal. This request includes an address of a destination trace log data handling device that is to receive trace log data associated with this request or data enabling the locating of the address. Based on this request, the core network management device automatically orders network elements of an access network section to perform tracing regarding the wireless terminal and ensures that trace log data associated with the request is sent to the destination trace log data handling device.

Another object of the present invention is to provide a core network management device for ordering a tracing of the activities of a wireless terminal in a wireless network, which allows a simpler and more user-friendly collection of the results of the tracing.

This object is according to a second aspect of the present invention achieved through a core network management device for ordering a tracing of the activities of a wireless terminal in a wireless network, which device is provided in relation to a core network section of the wireless network. The device includes at least one interface for communicating with other devices and entities and for receiving a request for a tracing regarding a wireless terminal, where the request includes an address of a destination trace log data handling device that is to receive trace log data associated with this request or data enabling the locating of the address. The device also includes a network trace management unit that automatically orders, based on the request, network elements of an access network section to perform tracing regarding the wireless terminal and ensures that trace log data associated with the request is sent to the destination trace log data handling device.

Another object of the present invention is to provide a method for initiating a tracing of the activities of a wireless terminal in a wireless network, which method allows a simpler and more user-friendly collection of the results of the tracing.

This object is according to a third aspect of the present invention achieved through a method for initiating a tracing of the activities of a wireless terminal in a wireless network. In this method an access network management device provided in relation to an access network section of the wireless network and managing network elements of this access network section receives a user selection of a wireless terminal for which a tracing is desired and sends a request for a tracing regarding the wireless terminal to a core network management device provided in a core network section of the wireless network. The request also includes an address of a destination trace log data handling device.

Yet another object of the present invention is to provide access network management device for initiating a tracing of the activities of a wireless terminal in a wireless network, which allows a simpler and more user-friendly collection of the results of the tracing.

This object is according to a fourth aspect of the present invention achieved through an access network management device for initiating a tracing of the activities of a wireless terminal in a wireless network that is provided in relation to an access network section of the wireless network and managing network elements of this access network section. The device includes a user interface, via which a user selected permanent wireless network identity associated with a wireless terminal for which a tracing is desired is received, a communication unit for communicating with other devices and entities, and a network trace requesting unit that is configured generate a request for a tracing regarding the wireless terminal, including an address of a destination trace log data handling device, and order the communication unit to send the request to a core network management device in a core network section of the wireless network.

The present invention has many advantages. It is user-friendly in that it provides a unified delivery of trace results to a destination device. This is furthermore possible in an environment where there are several different network management devices that are only managing some network elements. This also gives the network element suppliers a freedom in that they can select the way of delivering trace results that best suits them. It also allows flexibility in that different destination devices may be selected. In this way a destination device that is specialized in analyzing such trace results may be selected as a destination device.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

The present invention is directed towards initiating of tracing from network management devices that are provided in access network sections of a wireless networks. The present invention will in the following be described in relation to tracing being performed in an LTE (Long Term Evolution) network. It should however be realized that the present invention is not limited to LTE networks but may be provided in any wireless network such as UMTS (Universal Mobile Telecommunications), GSM (Global System for Mobile communications) and WLAN (Wireless Local Area Network).

The present invention will now be described in more detail in the non-limiting example context of a wireless network WN that is in the form of an LTE network, which is shown in a simplified form in FIG. 1. The wireless network WN is divided into a core network section CN and an access network section AN, which separation is indicated by a horizontal dashed line in FIG. 1. The core network section CN includes network elements in the form of a first pool of communication setup devices 28 and a second pool of communication setup devices 30. These communication setup devices 28 and 30 are responsible for providing communication and are normally provided as routers that route traffic to and from the access network section AN. Traffic is here provided as packet based traffic. In the core network section CN there is furthermore provided a low level core network management device 32, which is responsible for operation and maintenance (O & M) for network elements in the core network section CN, for instance routers from one specific supplier, which may be from the company Ericsson. Thus it should be realized that there may be several such low level core network management devices 32, at least one for each supplier of network elements in the network. Depending on the complexity of the network WN there may furthermore be more than one such low level core network management device for the same supplier. These low level core network management devices are often called SNM (Sub Network Manager), NEM (Network Element Manager) or EMS (Element Management System). There is furthermore a high level core network management device 34, which is responsible for network management of network elements independently of their origin. This device 34 works on a higher abstraction level than the low level core network management device 32 and also coordinates data from several low level core network management devices. This device 34 is often called NMC (Network Management Center). In the core network section CN there is furthermore provided a Home Subscriber Server HSS 36 and a Visitor Location Register VLR 38, where information about wireless terminals is kept. These are thus databases about wireless terminals in the network WN. The HSS 36 here keeps information about wireless terminals that are associated with the network, where a user of a wireless terminal may have a subscription to the use of the network, while the VLR 38 includes information about wireless terminals associated with other networks that are visiting the network. These are used in the routing of traffic to and from wireless terminals. However they are also used in the initiating of tracing, as will be described in more detail later.

Each pool of connection setup devices 28 and 30 is furthermore connected to a group of network elements in the form of wireless access point handling devices, which are here in LTE provided as eNBs (evolved NodeB). In FIG. 1 there is shown a first, second and third wireless access point handling device 10, 12 and 14 connected to the first pool of communication setup devices 28 and a fourth, fifth and sixth wireless access point handling device 20, 22 and 24 connected to the second pool of communication setup devices 30. Each wireless access point handling device here handles a geographical area in the form of a cell, via which wireless terminals may communicate with the wireless network. Here it should be realized that one wireless access point handling device may handle more than one cell. In the figure only one cell 18 associated with the first wireless access point handling device 10 is shown. The cells are all provided in a geographical area covered by the access network section AN. Wireless access point handling devices are within these types of networks base stations which in the case of LTE are enhanced and also include base station controller functionality. In other types of networks, like UMTS and GSM, these are separate network elements. In FIG. 1 one wireless terminal 16 is shown in the cell 18 handled by the first wireless access point handling device 10 in the access network section AN and shown as communicating with this first wireless access point handling device 10. It should be realized that normally there may be provided several wireless terminals communicating with a wireless access point handling device. There is furthermore shown an access network management device 26 provided in the access network section AN that is responsible for operation and maintenance (O & M) for network elements in the access network section AN. Also here there may be several such devices for manufacturers of different network elements in the access network section AN. This device is similar to the low level core network management device. The only difference between the access network management device 26 and the low level core network management device 32, apart from the obvious differences resulting because of the different nature of the network elements they are serving, is in many aspects only the network section they are provided in. Therefore the same terminology is often used for these network management devices. In FIG. 1 connections between the network management devices and the other entities of the network are shown with dashed lines as opposed to the connection between communication setup devices and wireless access point handling devices in order to differentiate between actual traffic and operation and maintenance. The wireless access point devices are thus network elements that are managed by the access network management device 26, while the connection setup devices 28 and 30 are network elements managed by the low level core network management device 32.

Figure 2:
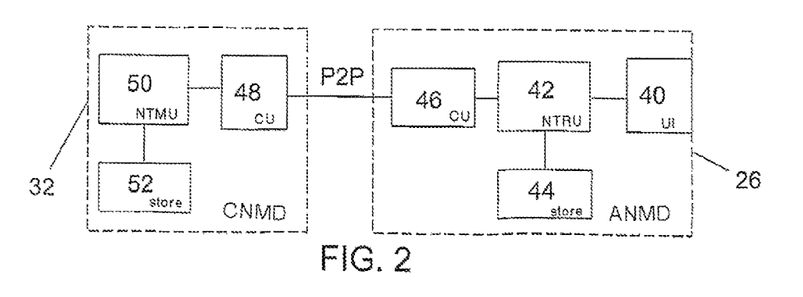
FIG. 2 shows a block schematic of an access network management device which is communicating with a low level core network management device.

FIG. 2 shows a block schematic of the access network management device 26 and the low level core network management device 32. These devices are here furthermore shown as communicating with each other using a peer-to-peer interface P2P. The access network management device 26 includes a user interface 40, which may include a keyboard and display and is connected to a network trace requesting unit 42. The network trace requesting unit 42 is furthermore connected to a first store 44 and to a first communication unit 46 for communication with other entities inside and outside the wireless network WN. The low level core network management device 32 includes a second interface 48, also provided for communication with other entities inside and outside the wireless network WN. The second communication unit 48 is in turn connected to a network trace management unit 50. The network trace management unit 50 is finally connected to a second store 52.

Tracing of the activities of wireless terminals is important for many reasons. This may be necessary in order to obtain information about how different network elements are functioning as well as of how wireless terminals are functioning. They are also used for troubleshooting purposes. Information that may be of interest is information like information about dropped calls and dropped handovers between different access points.

The ordering of such tracing in these wireless networks has to be performed from the core network section CN because of security reasons. However, the devices that normally need such tracing are in many instances the access network management devices. Today there exist no simple way to initiate such tracing from the access network. The present invention is therefore directed towards simplifying such initiating of tracing.

Figure 3:
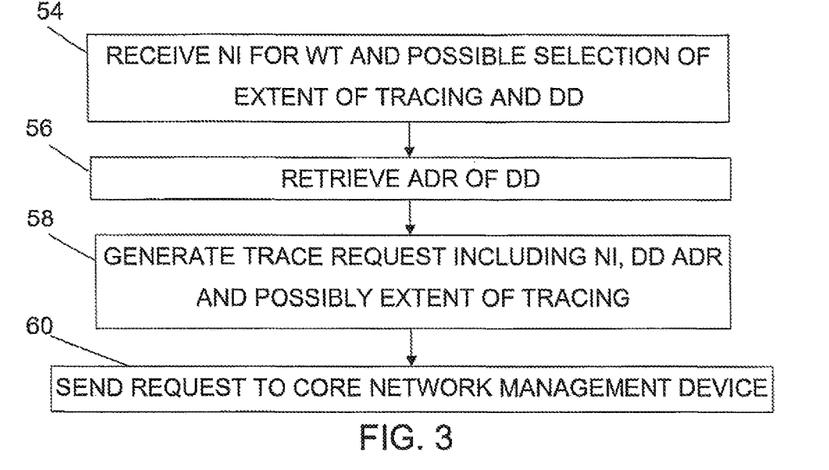
FIG. 3 shows a flow chart of a number of general method steps according to the invention taken in the access network management device.
Figure 4:
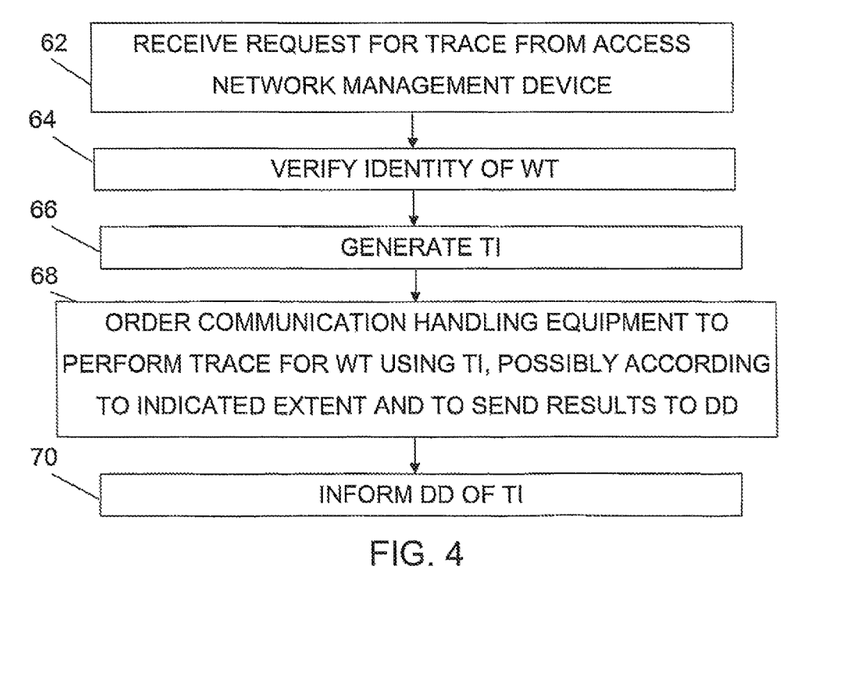
FIG. 4 shows a flow chart of a number of general method steps according to a first variation of the present invention taken in the low level core network management device.

Now the initiating and ordering of tracing to be performed according to a first variation of the present invention will be described with reference being made to FIGS. 1, 2, 3 and 4, where FIG. 3 shows a flow chart of a number of general method steps according to the invention taken in the access network management device and FIG. 4 shows a flow chart of a number of general method steps according to a first variation of the present invention taken in the low level core network management device.

Figure 1:
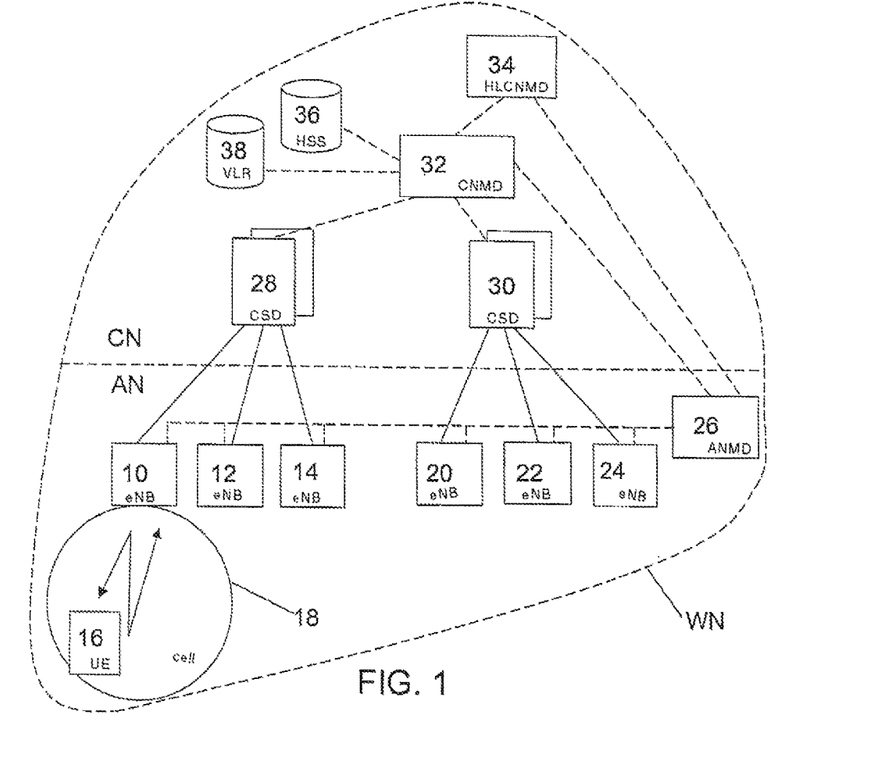
FIG. 1 schematically shows a wireless network comprising an access network section and a core network section.

It all starts with an operator of the access network management device 26 wanting to trace the activities of a wireless terminal, for instance wireless terminal 16 in FIG. 1. He/she may then start a trace initiating application that is provided by the network trace requesting unit 42 of the device 26. In this application he/she may furthermore be presented with the possibility to enter some necessary data via the user interface 40. In order to do this he has to have knowledge of a permanent wireless network identity (NI) associated with the wireless terminal (WT) 16. This identity may be an identity that is directly associated with the terminal in question, such as an IMEI (International Mobile Equipment Identity). However it may also be an identity that belongs to the user of the wireless terminal (WT), such as an identity associated with a subscription to the services of the network. This type of identity may belong to a SIM card being inserted in the wireless terminal, a so-called IMSI (International Mobile Subscriber Identity). In the simplest form of the invention an identity associated with the wireless terminal is all the data the user may have to enter via the user interface 40. However he may also be presented with some further possibilities, like to indicate the extent of the tracing and a possible trace log data handling destination device (DD) that is to receive log data resulting from the performed tracing. The trace log data handling destination device may be the access network management device 26, in which case there may be no need to make an indication of destination device. There may also exist a possibility to select a number of different trace log data handling destination devices, as well as a possibility for the user to enter information that enables the identification of a suitable trace log data handling destination device. He/she may for instance be presented with a list of names of such trace log data handling destination devices. It is furthermore possible that the tracing is to cover all activities of the wireless terminal, in which case there may be no need for indicating the extent. The user interface 40 thus receives the network identity of the wireless terminal together with a possible selection of the extent of the tracing and a destination device selection, step 54. This information is then forwarded to the network trace requesting unit 42.

The network trace requesting unit 42 then retrieves an address of the trace log data handling destination device based on the entered data, step 56, which address is stored in the first store 44. In case no destination device was indicated or in case the access network management device was selected as destination device by the user, then the address is the address of the access network management device 26. This address would of course not be retrieved if the user had entered a trace log data handling destination device address directly. The address is normally provided in the form of an IP (Internet Protocol) address. Thereafter the network trace requesting unit 42 generates a request for a tracing of the activities of the selected wireless terminal 16, step 58. This request then includes the network identity, destination device address and data indicating the extent of tracing in case the user had submitted such an indication. The request may also include a time period within which the request is applicable and/or a starting and/or an end time for the applicability of the tracing. As an alternative there may exist a default setting in the system of how long traces are applicable, which all network management devices and network elements know about. Thereafter the request is sent to the low level core network management device 32 via the first communication unit 46 over the peer-to-peer interface P2P, step 60. The request including the address may be sent using a management protocol, like SNMP (Simple Network Management Protocol), CORBA (Common Object Request Broker Architecture) or SOAP (Simple Object Access Protocol). It is also possible to send a request to end a trace at a later time from the access network management device 26.

Since there can be different suppliers or the network may be very large, the request may be sent to several low level core network management devices. However, in order to keep the description of the present invention simple, a request will in the following only be described in relation to being sent to one low level core network management device. A request may as an alternative be sent to the high level core network management device 34, which takes care of the handling of the request instead.

The request is then received by the second communication unit 48 of the low level core network management device 32, step 62, from where it is forwarded to the network trace management unit 50. The network trace management unit 50 then verifies the device identity, step 64, which is done through investigating the HSS 36 and/or the VLR 38 via the second communication unit 48 in order to make sure that the wireless terminal 16 is located in the network WN. In case it is not, but belongs to the network WN, the request for a trace is forwarded to another network. It may also involve finding out an IMEI from an IMSI or vice versa to be used in the tracing. After the identity has been verified, the network trace management unit 50 generates a trace identity (TI), step 66, and then automatically orders the relevant network elements (10, 12, 14, 20, 22, 24) to perform a tracing of the activities of the wireless terminal 16, step 68. In this variation of the present invention, the order includes an identity associated with the wireless terminal, i.e. either an IMEI or an IMSI or equivalent identifiers, the trace identity, the trace log data handling destination device address and possibly also information about the extent to which the trace is to be performed. In this first variation of the invention the order also includes an instruction to send log data, i.e. the results of the tracing to the trace log data handling destination device that is identified by the destination device address in order to ensure that the destination device receives the trace log data. This may be done through sending the request to one or more of the pool of connection setup devices which in turn order their connected wireless access point handling devices to perform tracing of the activities of the wireless terminal. Finally the network trace management unit 50 informs the trace log data handling destination device, which may thus be the access network management device 26, of the trace identity used for the trace, step 70, via the second communication unit 48.

Thereafter the activities of the wireless terminals 16 are traced and logs including log data regarding these activities are created in the different network elements according to the extent indicated. Logs are here created as soon as the wireless terminal 16 is engaged in some activity. No logging takes place if it is not active. Here each access point handling device 10, 12, 14, 20, 22, 24 logs data about the wireless terminal in case it is active in relation to it, for instance based on handovers from node to node or when traffic is received and sent to and from the wireless terminal 16 via the corresponding access point. The log data, which may include information, such as information about the speech quality and events that have occurred (like a dropped call or a handover) is then stored using the same trace identity in all the network entities where a log is created. Other activities that can take place and be logged are location updating and periodic updates. Thereafter when tracing is to be ended, which may thus be based on a pre-set time having lapsed, having received a stop tracing order from the low level core network management device 32 or through having determined that an indicated duration provided in the order having lapsed, the log data is sent to the destination device from all these network elements using the destination device address. Here the log data is only accompanied by the trace identity, because the network elements are for security reasons normally not allowed to use the identity of the wireless terminal in communication. The destination device may then analyze the log data.

Now a second variation of the present invention will be described with reference being made to FIGS. 1, 2, 3 and 5, where the latter figure shows a flow chart of a number of general method steps according to this second variation of the present invention taken in the low level core network management device 32.

As in the first variation an operator of the access network management device 26 enters a permanent wireless network identity (NI) associated with the wireless terminal (WT) 16, possibly together with the extent of the tracing and a possible indication of a trace log data handling destination device (DD) to the network trace requesting unit 42 via the user interface 40, step 54. The network trace requesting unit 42 then retrieves the address of the destination device from the first store 44, step 56, generates a request for a tracing relating to the selected wireless terminal, where the request includes the network identity, destination device address and data indicating the extent of tracing in case the user had submitted such an indication, step 58. Thereafter the request is sent to the low level core network management device 32 via the first communication unit 46 over the peer-to-peer interface P2P, step 60.

Figure 5:
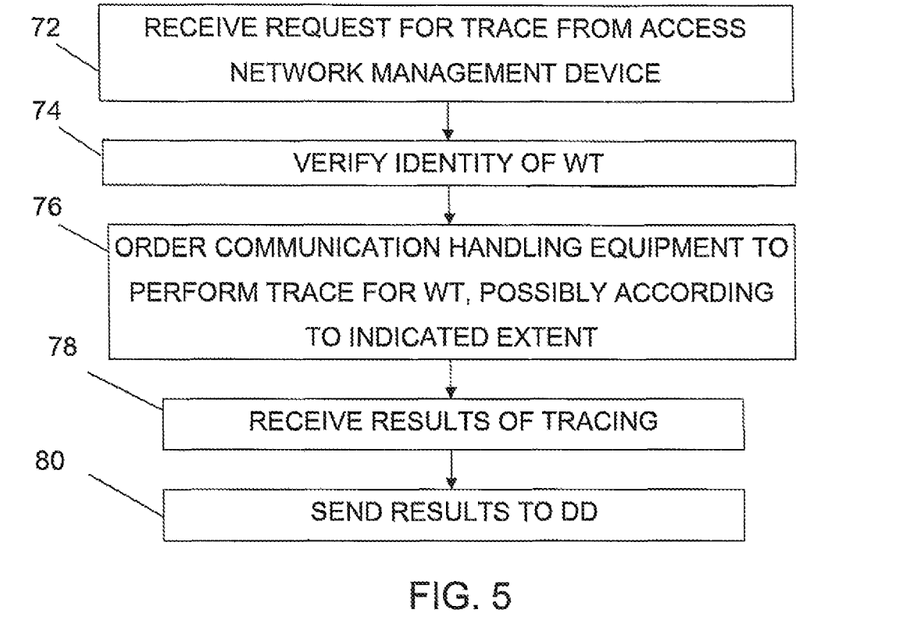
FIG. 5 shows a flow chart of a number of general method steps according to a second variation of the present invention taken in the low level core network management device.

The request is also here in the second variation received by the second communication unit 48 of the low level core network management device 32, step 72, and forwarded to the network trace management unit 50. The network trace management unit 50 again verifies the device identity, step 74, generates a trace identity and automatically orders the relevant network elements to perform a tracing regarding the wireless terminal, step 76. The trace identity is also stored in the second store 52 for later use. It may here be stored together with the destination device address and possibly also together with the received wireless terminal identity. In this variation of the present invention, the order as earlier includes an identity of the wireless terminal, the trace identity, the destination device address and possibly also information about the extent to which the trace is to be performed. However, there is no order to send log data, i.e. the results of the tracing to the destination device address. It is however possible that the destination device is informed of the trace identity. Instead the network elements report their results of the tracing to the low level core network management device 32. An instruction to report the results may be explicitly included in the order, or these elements may be pre-programmed to always send the log results to the low level core network management device 32. As before the request may be sent to one or more of the pool of connection setup devices, which in turn order their connected wireless access point handling devices to perform tracing of the activities of the wireless terminal.

When logging is then performed in the different network elements, each access point handling device 10, 12, 14, 20, 22, 24 logs data about the wireless terminal 16 in case it is active in relation to it, for instance based on handovers from node to node or various traffic being transferred between the wireless terminal and the network via it. Log data is then stored in the network element using the same trace identity. Thereafter when tracing is to be ended, the log data is sent to the low level core network management device 38. The network management unit 50 of the low level core network management device 38 therefore receives the results of the tracing, step 78, in the form of the log data which is accompanied by the trace identifier. Based on the trace identifier it then fetches the destination device address as well as possibly the wireless terminal identifier and thereafter sends the results of the tracing to the destination device via the second communication unit 48, step 80, in order for the destination device to be able to analyze the log data. In this way it ensures that the destination device receives the trace log data. It is here possible that the low level core network management device 32 gathers all log data from the different network elements before it is sent to the destination device.

It should here be realized that the first and second variation described above may be combined in the same network, in that some network elements associated with one low level core network management device may send log data directly to the destination device, whereas other that are associated with another low level core network management device may send log data to this low level core network management device, which in turn sends the log data to the destination device.

The extent of tracing can be defined in some different ways. It is possible that a tracing can be requested for the whole network or be limited to a part of the network, for instance to all or some of the access point handling devices connected to one or a limited number of pool of connection setup devices. In this case the request for a tracing sent to a core network management device would include data regarding a part of the wireless network where the tracing should be carried out. It is also possible to limit the tracing to only some type of activities of the wireless terminal or to some type of data, such as for instance only dropped connections or missed handovers. In this case the request for a tracing sent to a core network management device would include an indication of the type of wireless terminal activities and/or data to be logged.

Trace log data may be logged in wireless access point handling devices of the core network, such as connection set up devices 28, 30, as well as in the wireless access point handling devices 10, 12, 14, 20, 22, 24 of the radio network. The core network management device 32 receive the trace log data from the core wireless access point handling devices such as the connection set up devices 28, 30. This can be made on a regular basis during the trace or when the trace period is ended. The core network management device 32 sends the collected trace log data to the destination device address.

In a third variant of the invention instead of sending the trace log data to the destination device address, information is sent to the destination device address on nodes having trace log data available for the destination device upon request. The information includes the trace identity. Typically the network elements 10, 12, 14, 20, 22, 24 and/or the core network management device 32 send the information over IP communication protocol format. The address of the originating wireless access point handling device 10, 12, 14, 20, 22, 24 and/or the core network management device 32, will the automatically be available to the recipient destination device. This is somewhat more elaborated further down in the text.

The destination device sends a second request addressed to the nodes that has informed of they have trace log data available. The second request includes the trace identity, and optionally an indicator of a trace depth log data requested. The second request may optionally also include and admission for trace log data to be deleted after having been forwarded to the destination device.

An advantage with this third variant is that the destination device can get access to trace log data also during the period the trace is still going on, or be collected for just a trace depth of interest. A first collection of low depth trace data may give an indication on what problems exist in the network and if the problem is relates to only some of the network elements 10, 12, 14, 20, 22, 24. Based on the conclusion of the first collected data a second collection can be requested from the destination device, from only a subset of the network elements and or a further trace depth. Thereby, the amount of trace log data transmitted to the destination device can be reduced, and the risk of congestion on links reduced. A further advantage is the trace log data can be requested by the access network management device 26, if it is the destination device, when the traffic load is low.

In the third alternative the destination device is preferably the access network management device 26, because of security and admission control reasons.

The peer-to-peer connection may be provided through each network management device having a manager object communicating with a proxy object provided in the corresponding network management device with which communication is performed. These proxy objects may be provided as border objects that communicate with each other in the different network management devices. More details of this type of communication may be found in 3GPP TR 32.806 V7.0.0 (2006-06), which is herein incorporated by reference.

As mentioned before the destination device may be the same device that initiated the tracing of log data. In case this is the only option provided for the user, it is not necessary to allow the user to enter information allowing an address to be found. The address may thus be selected automatically. The request does then furthermore not have to include an address, since in IP communication this address is provided in the data packets in which the request is sent. Also the network elements in the access network section may know about the address beforehand, because the access network management device is the management device they normally communicate with. In this case they may be configured to always send log data to this access network management device. However, when the destination device is another device, this address normally has to be included. However it is also possible that only an identifier is included, which allows the core network management device to locate the correct destination device. The destination device may be another access network management device in the same or in another network. It may furthermore be the high level core network management device. It can furthermore be a completely different device, for instance a separate device, like a PC, including a separate script or post processing tool specialized for this purpose, such as TEMS™. The device may also be a database.

The second communication unit is one interface over which the low level core network management device is able to communicate with other devices. It may also be provided with a user interface like a keyboard, via which a user may enter information. In another variation of the present invention the request is provided by a user to this low level core network management device via this user interface instead of being sent from an access network management device. In this case the request that is entered may include only a pointer to the address, i.e. data enabling the locating of the address, which pointer the network trace management unit of the low level core network management device then uses to find the address. The same principles for locating the address that were described in relation to the access network management device may thus also be applied here.

The method steps and activities performed by the low level core network management device that were described above may as an alternative be performed by the high level core network management device.

The present invention has many advantages. It is user-friendly in that it provides a unified delivery of trace results to a destination device. This is furthermore possible in an environment where there are several different network management devices that are only managing some network elements. It also allows flexibility in that different destination devices may be selected. In this way a destination device that is specialized in analyzing such trace results may be selected as a destination device. The invention furthermore allows initiation of the tracing of the activities of a wireless terminal in a wireless network from an access network management device. Tracing can also be initiated for other networks if the wireless terminal is located there.

The network management devices according to the present invention can be implemented through one or more processors together with computer program code for performing the functions of the invention. The program code mentioned above may also be provided as a computer program product, for instance in the form of a data carrier carrying computer program code for performing the method according to the present invention when being loaded into a network management device.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

What is claimed is:

1. Method for tracing activities of a wireless terminal in a wireless network, comprising:
receiving, in a core network management device, a first request for tracing activities of a first wireless terminal;
ordering, based on said request, wireless access point handling devices to perform tracing of activities of said first wireless terminal; and
ensuring that trace log data associated with said first request is sent to a destination trace log data handling device.

2. The method of claim 1, wherein ensuring that trace log data associated with said first request is sent to the destination trace log data handling device comprises ordering the wireless access point handling devices to send trace log data associated with said first request regarding the wireless terminal to a destination trace log data handling device address included in the first request.

3. The method of claim 1, wherein ensuring that trace log data associated with said first request is sent to the destination trace log data handling device comprises ensuring that information is sent to the destination trace log data handling device regarding identities of one or more nodes that keep said trace log data associated with said first request.

4. The method of claim 1, wherein the core network management device is provided in a core network section of the wireless network.

5. The method of claim 1, wherein the wireless access point handling devices are provided in an access network section of the wireless network.

6. The method of claim 1, wherein said first request includes one of an address of a destination trace log data handling device that is to receive trace log data associated with said first request, and data enabling the locating of the address.

7. A core network management device configured to order a tracing of the activities of a wireless terminal in a wireless network, provided in relation to a core network section of the wireless network, comprising:
at least one interface configured to communicate with other devices and entities and further configured to receive a request for tracing activities of a first wireless terminal; and
a network trace management circuit configured to:
receive said request from the interface,
order, based on said request, wireless access point handling devices to perform tracing of activities of said first wireless terminal; and
ensure that trace log data associated with said request is sent to a destination trace log data handling device.

8. The core network management device of claim 7 wherein the network trace management circuit, when being configured to ensure that trace log data is sent to the destination trace log data handling device, is configured to ensure that information is sent to the destination trace log data handling device for identifying one or more nodes that keep said trace log data associated with said first request.

9. Method for tracing of activities of a wireless terminal in a wireless network, comprising:
receiving, in a wireless access point handling device, a request to perform tracing of activities of a first wireless device from a core network management device;
tracing the activities of a first wireless device; and
sending the traced activities to a trace log data handling device.

10. The method of claim 9 wherein the wireless access point handling device is provided in an access network section of the wireless network.

11. The method of claim 9 wherein the core network management device is provided in a core network section of the wireless network.

12. A wireless access point handling device configured to receive a request to perform tracing of activities of a first wireless device from a core network management device;
trace the activities of the first wireless device; and
send the traced activities to a trace log data handling device.

13. The wireless access point handling device of claim 12, wherein the wireless access point handling device is one of a base station, radio network controller (RNC), base station controller (BSC), or eNodeB.

14. The wireless access point handling device of claim 12, wherein the core network managing device is a core network managing device of a Universal Mobile Telecommunications (UMTS), Global System for Mobile communications (GSM) or Long Term Evolution (LTE) core network.

15. The core network managing device of claim 7, wherein the core network managing device is a core network managing device of a Universal Mobile Telecommunications (UMTS), Global System for Mobile communications (GSM) or Long Term Evolution (LTE) core network.

16. The method of claim 1, wherein the log data indicates activities of the first wireless terminal related to handover.

17. The method of claim 1, wherein the log data indicates activities of the first wireless terminal related to speech quality.

18. The method of claim 1, wherein the first request indicates an extent of tracing which is to be performed by the wireless access point handling devices.

19. The method of claim 18, wherein the first request indicates an extent of tracing by limiting the tracing to a subset of a plurality of wireless access point handling devices in the wireless network, and wherein the ordering wireless access point handling devices to perform tracing comprising ordering the subset to perform the tracing.

* * * * *